Nov. 23, 1954     H. GUENTSCHE ET AL     2,694,950
HYDRAULIC TORQUE CONVERTER TRANSMISSION
Filed Oct. 8, 1947     6 Sheets-Sheet 1

Fig. 2

Nov. 23, 1954     H. GUENTSCHE ET AL     2,694,950
HYDRAULIC TORQUE CONVERTER TRANSMISSION
Filed Oct. 8, 1947     6 Sheets-Sheet 4

United States Patent Office 2,694,950
Patented Nov. 23, 1954

2,694,950

HYDRAULIC TORQUE CONVERTER TRANSMISSION

Helmuth Guentsche and Laurence A. Nelson, Pontiac, and Hans O. Schjolin, Birmingham, Mich., assignors to General Motors Corporation, Detroit, Mich., a corporation of Delaware Application October 8, 1947, Serial No. 778,612

10 Claims. (Cl. 74—732)

The present invention relates to driving mechanism for vehicles, in which fluid torque converter devices are incorporated for providing infinitely variable speed ratio changes over predetermined relatively speed ranges, with effective torque multiplication, and pertains in particular to a form of fluid torque converter of simple construction which yields effective torque multiplication comparable with more elaborate and complicated fluid turbine drive apparatus.

The fluid torque converter shown in the present demonstration is of particular sectional form and blade arrangement, departing in principle from certain of the teachings in this art, as is set forth further in detail below.

It is an object of the invention to provide a fluid torque converter of the turbine type which shall produce a useful and effective torque multiplication between input and output members, with a minimum number of rotors, the said converter herein having two stages of energy transfer, one of which is a power-to-load coupling stage, and the other of which is a reaction stage, to conform to the stated object.

It is a further object to arrange the inflow and outflow zones of the converter such that the first of said stages is located wholly within the outflow zone, and the second reaction stage is located wholly within the inflow zone.

An additional object of our invention is to further separate the coupling stage of the outflow zone from the reaction stage of the inflow zone by utilizing flow guide passages at the extreme outer and inner radial, bridging portions of the converter working space between the inflow and outflow zones, which guide passages are continuous and smooth, and without blades. It is an object herein to provide a fluid torque converter of the turbine type which shall have bladeless guide passages at the extreme radial portions of the working space.

Another object is the provision of especially adapted gear train and clutching mechanism for providing an overall drive assembly affording exceptional advantages in convenience of assembly in vehicles driven by transversely-mounted power plants, wherein the centerline of the variable ratio drive is set at an angle to that of the power plant, the whole variable torque conversion of the assembly being provided for in the angularly related construction.

Among the objects and advantages achieved herein, is the practical application of the torque converter noted preceding, to the drive of vehicles, demonstrated in three different constructional forms. These applications show the use of the torque converter in two types of application, one having a non-rotating reaction member and the other a rotating reaction member restrained against backward rotation.

The applications further show the use of a driving assembly having two input friction clutches alternately operable to drive the torque converter or the driven shaft, the latter operation being assisted by a 1-way clutch connected to couple upon overtaking by the driven shaft of the driving shaft. They show in another version a different combination in which the converter and step-ratio gearing are located at one end of the assembly and the direct coupling clutch is located at the other, the converter impeller being constantly power connected.

A third modification showing locates the converter and its mechanism at one end of the oblique assembly and the direct drive clutch device with the step gear unit at the other. All of these arrangements have certain stated advantages in assembly, disassembly and repair or adjustment.

The direct drive clutch noted, appears as a synchonized jaw clutch in two of the aforesaid arrangements, and a braking device is provided to facilitate mesh of the positive jaw and gear elements of the assembly of one of these versions.

The description below provides a generalized form of the torque converter in Fig. 1, a structurally different adaptation in Figures 2 and 3; one form of applied use in a vehicle in Fig. 4, another in Fig. 6 and a third in Fig. 8.

Figure 1:
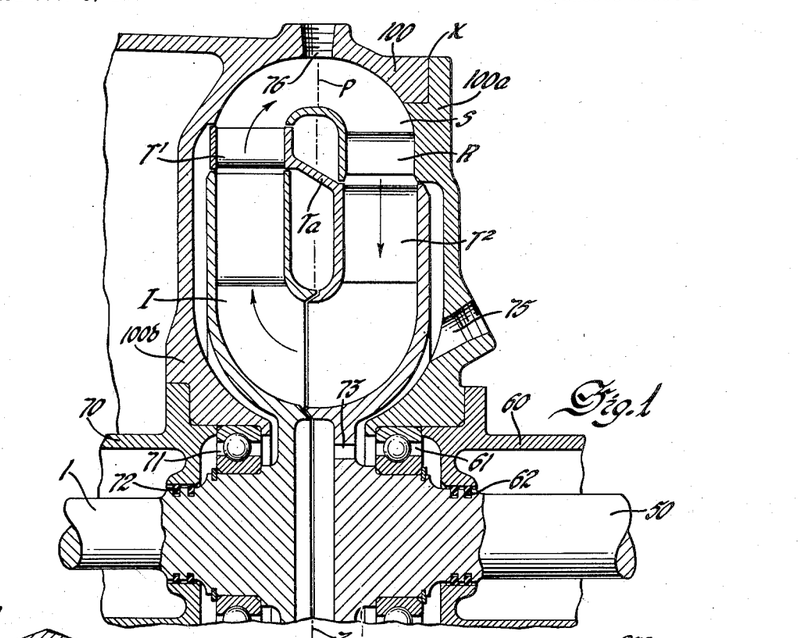
Fig. 1 is a partial vertical section of a fluid torque converter device having a blade arrangement corresponding to the invention herein.

In Fig. 1 the fluid torque converter radial section is shown, the line PZ dividing the device into outflow and inflow zones, this terminology referring, of course, to the normal toroidal movement of the fluid of the working space with respect to the axis of rotation.

The shaft 1 drives the bladed impeller I, which imparts an outward force component to the working space oil body. In passing outward thru the next ring of blades $T^1$ rotating with output shaft 50, a torque increment is applied to shaft 50 by extraction of energy from the flow, by the blades $T^1$. The fluid then passes radially outward to a void space S within the enclosing guide space portion of the casing 100 and crosses the median radial plane PZ dividing the inflow and outflow zones, passing inward thru reaction blades R formed as part of the casing web 100a, and providing angular reaction for the flow which enables the second set of output-connected blades $T^2$, to extract energy from the flow. The cycle of fluid motion about the toroidal working space is completed when the liquid again passes over the median plane to the input or suction space of the impeller I.

The arrangement of the bladed elements with respect to the flow zones and combined with the void external channel bridging the inflow and outflow paths is a considerable departure from the teaching of the Föttinger patents mentioned further herein, and the resulting low losses coupled with the other features of the present description enable one to build the fluid torque converter at low initial cost, with a simple form of construction, and to operate same under working conditions in which more elaborately formed devices are handicapped by excess weight and size, cooling problems and other complications not encountered here.

Structure-wise, the device of Fig. 1 consists of a group of bladed elements, impeller I, first rotor $T^1$, reaction ring R, and second rotor $T^2$, the impeller being attached to input shaft 1, and the rotors $T^1$ and $T^2$ connected together at $Ta$, attached to output shaft 50. The casing 100 is joined at X, the portion 100a being shaped to fit retaining sleeve 60 and bearing 61 supporting shaft 50, the inner flange of sleeve 60 cooperating with ring seals 62 recessed in grooves in the shaft 50. Similarly sleeve 70 and bearing 71 support shaft 1 the rings 72 sealing the space behind the bearing. Passage 73 connects the central disc-shaped space between the rotor $T^2$ and impeller I to the space adjacent bearing 61 and open to the outer wall area of rotor $T^2$. Drilled passage 75 is open to the latter space, in which the low pressures of the working space appear, as distinct from the higher pressures existing in the bridging inter-zone space S joining the outflow and inflow zones, connected to passage 76.

When the turbine is operating, the differential pressures existing in passages 75 and 76 may be used to create circulation thru external piping, reservoirs, cooling radiators and pumping system, as is known in this art.

This converter structure is simple, compact, and may be made to yield a high torque capacity with respect to its volumetric displacement, as will be understood further.

Energy is more effectively extracted by the output connected rotors, with conversion of torque, by the sequence of impellers, rotor sections and reaction blade ring in the cycle of fluid body motion thru the outflow and inflow zones.

The present disclosure has only the impeller and first rotor in the outflow zone, and the reaction blades are located in the inflow zone in the circuit of flow adjacent the second output rotor.

This sequence restricts the primary input-to-output couple to the outflow zone, and the reaction conversion couple to the inflow zone, except for the residual value transferred from the stream leaving the second rotor and passing into the impeller in the inward radial space.

The structural arrangement of Fig. 1 provides further a feature of novelty in the combining of the flanged casing web 100a with the reaction ring R and the scarf of the outer cross-flow zone of the working space, in one piece. This enables the unit to be disassembled readily, by removal of shaft sleeve 60, web 100a, shaft 50 with rotors $T^1$ and $T^2$, and shaft 1 with impeller I, in order. This arrangement provides the lateral seals at 62 and 72 subject only to the low pressure of the unit, and does not require a central seal, or pilot bearing. The bearings 61, 71 in webs 100a, 100b with sleeves 60 and 70 provide adequate support of beam loads and are located in planar positions coinciding with the points of maximum beam deflections resulting from torque on the impeller and rotors.

Figure 2:
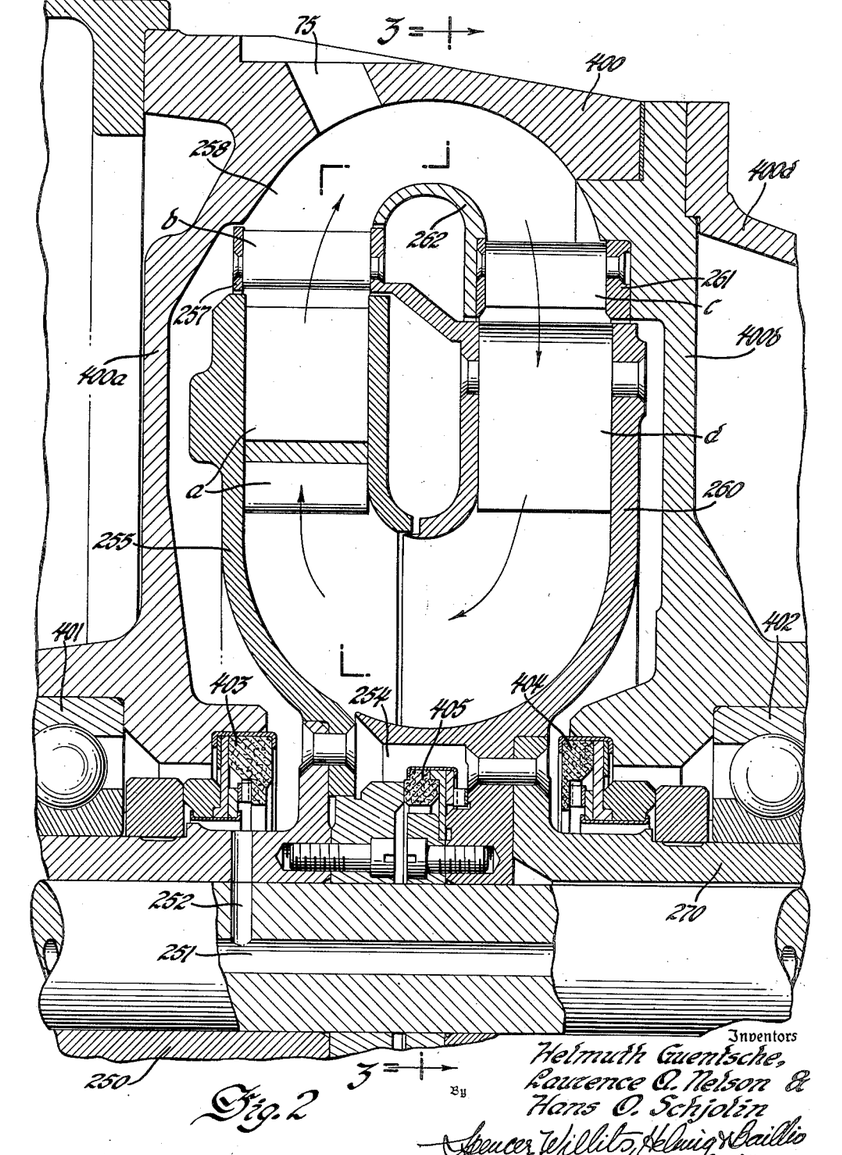
Fig. 2 is a view similar to that of Fig. 1, differing in the relative displacement and location of the seals, bearings and other drive elements.

The torque converter of Fig. 2, like that of Fig. 1, is generally of the two-stage type such as shown in Figs. 2, 7 and 13 of Föttinger U. S. 1,199,360 and Figs. 12, 13 and 16 of U. S. 1,199,359, to the same inventor.

Figure 3:
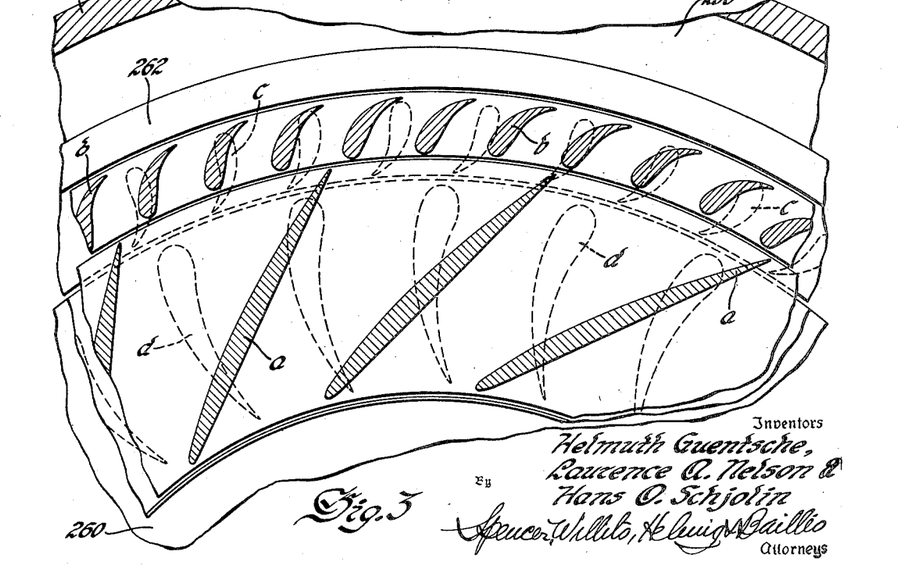
Fig. 3 is a transverse planar view, in part section, taken at 3—3 of Fig. 2.

The input power in Fig. 2 is applied to shaft 250 attached to impeller 255 having blades $a$ formed and inclined as shown in Fig. 3. The first ring of rotor blades 257 is located in the toroidal flow path on the outflow side thereof, and its blades $b$ are formed sectionally as given in Fig. 3. The outermost space 258 is merely a director channel without vanes, so as to guide the flow with minimum turbulence, from outflow to inflow zone.

The reaction blades $c$ are affixed to the non-rotating casing web 400b and direct the inward flow from space 258 to the output rotor blades $d$, of rotor 260 attached to 257 and to shaft 270.

The relative angularities of blades $a$ and $b$ provide a torque component in the positive drive direction which varies with velocity of shaft 250, with the differential torque and speed of 250 and shaft 270.

The radial walls 400a and 400b form a compartment for the converter, and support the bearings 401 and 402 which in turn support shafts 250 and 270. The seal 403 prevents leakage of liquid from the space between impeller 255 and wall 400a and seal 404 prevents leakage from the space between rotor 260 and wall 400b.

The converter is kept filled by fluid supplied, for example from drilled shaft passage 251 and radial passage 252; it may be supplied similarly to space 254 radially inward of the working space, or it may be supplied thru similar drillings in the adjacent end of shaft 270, if required. The shaft passage 251 may be fed by a pump or reservoir connected to a feed gland surrounding either shaft. Seal 405 prevents leakage from space 254 into the spacing between the relatively rotatable shafts 250 and 270.

The casing portion 400d in Fig. 2 may be part of the adjacent gear unit support structure, as will be understood further.

The web 400b is flanged to be bolted between the adjacent portions of 400 and 400d, is fixed to the reaction blade ring 261 and provides internal support for bearing 402 of output shaft 270, and for seal 404.

In disassembly for inspection, repair or replacement, the bolts are removed from the flanging of 400, 400b and 400d, and the web 400b with bearing 402 and the reaction ring 261 are slidden away from the output rotor 260. The core scarf at 262 is of a piece with the reaction ring 261, so that the first rotor blades of ring 257 will slide free axially when the shaft 270 and output turbine wheel assembly is to be removed.

The impeller 255 and shaft 250 may then be moved to the right, clear of the web 400a. These members are replaced in reverse order.

This arrangement of the web 400b, reaction ring 261 and scarf 262 is believed novel, and useful in providing maximum accessibility.

The blading arrangement with the unencumbered guide flow space as in Figs. 1 and 2 and shown in Fig. 2 at 258, is better understood by reference to patent to Föttinger, U. S. 1,199,360, where in Fig. 2, impeller 31 delivers fluid to output-connected rotor ring 32, the reaction vanes 33 being located at the point of maximum zonal velocity, from whence the inward flow encounters rotor vanes 35 rotating with primary ring 32 and shaft 29.

Figure 7:
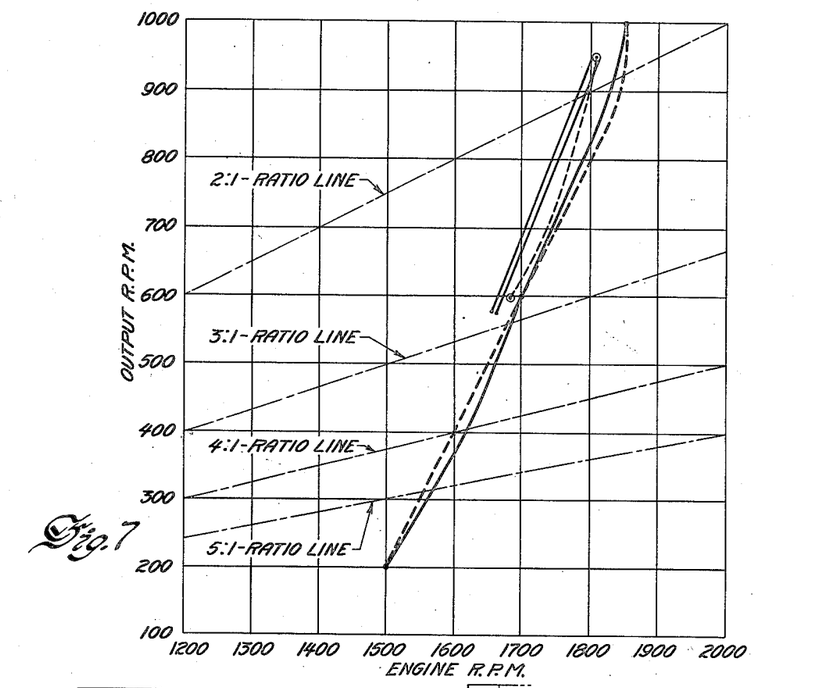
Fig. 7 is a chart derived from tests made of the fluid torque converter described in this specification, compared with parallel tests made of a converter of different type.

Föttinger also shows a two-stage arrangement in his Fig. 7 in which there are two impeller members 60 and 61 located in approximate radial alignment, with the output rotor in the outflow zone and the reaction vanes in the inflow zone.

Figure 9:
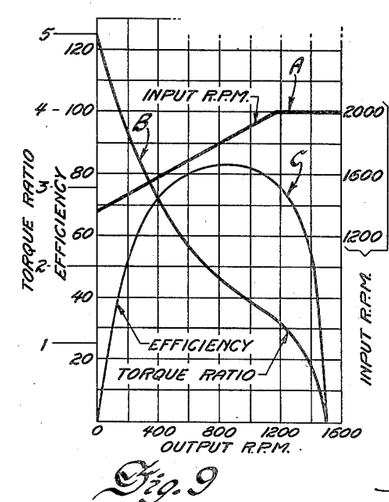
Figs. 9 and 10 show performance.

In his Fig. 13, the schematic diagram of the flow pattern resembles his Fig. 2. Fig. 13 of Föttinger's patent has two conversion stages in series in the outflow zone, the reaction ring constituting nearly three fourths of the working zone. The angularities of the blade elements of his Fig. 7 blades are shown in Fig. 9.

In Föttinger, U. S. 1,199,359, Fig. 12 shows two conversion stages in the outflow zone, and Fig. 13 is like Fig. 13 of U. S. 1,199,360. His U. S. 1,199,361, Fig. 13 shows a 2-stage arrangement like the Figs. 13 noted above, and in Fig. 16.

The chart of Fig. 7 is a representation of actual test results of a typical device built and operated in accordance with the present invention. The heavy line extending from 200 R. P. M. output to 1000 R. P. M., output shows the level road acceleration of the device as installed in a vehicle and the dashed line adjacent, shows that of a typical 3-stage unit compared. The caption numerals show the output to input speed ratios.

The diagonal light lines indicate the reduction ratios from 5-to-1 up to 2-to-1.

The double line toward the left provides a conception of the hill-climbing ability of the device from 11.6 thru 9.7 to 7.2 percent gradient, comparing with the equivalent results of the same 3-stage unit, shown in dotted line.

It is apparent that the less complicated 2-stage device of the present invention compares favorably with the 3-stage unit, and for given operational requirements, may be utilized as efficiently.

One should recall that the torque characteristics of different types of engines require coordination with the peculiar torque ratio characteristics of the fluid torque converter, for given loads and final drive axle ratios, for the attaining of desired overall performance and economy. From the performance approximation chart of Fig. 7, it is obvious that the present invention may give the designer as full latitude in choice of engine and axle ratio, as obtained from the multi-stage unit.

The charted data merely indicates the typical performance of one 2-stage unit built in accordance with the invention and other units may show greater margins of utility as added design refinements appear.

Over the past fifteen years, engineers in this field have busied themselves with trial and use of many differing forms of blade sections, some of exaggerated thickness with very blunt noses and others extremely thin with sharp noses.

We have found that the number of vanes in a ring with respect to the net thickness of the vanes is a useful factor; that the impact or shock losses are best calculable with respect to the normal speed ratio range over which the device being designed is to be operated, and that instead of following either extreme of blade section form, the optimum blade section is neither very blunt-nosed nor sharp, and that the angularities or bends of the flow path thru the stages should be held to small values wherever possible.

In the present demonstration, we have followed the blade form teachings in the field of fluid turbines where the overall design problems are the same as in Föttinger type torque converters.

For impeller vane angles, the design knowledge in the water wheel and centrifugal pump art is available to all. For reaction and rotor vane angles, we find that there is no need for acute angularities, such as some patentees have shown in units having vanes in the internal and external spaces bridging the inflow and outflow zones. We find that for a given torque capacity and desired useful speed ratio range, the overall diameter and volumetric space for the torque converter may be reduced herein below the values needed for a comparative 3-stage converter. This saving in space and likewise in weight increases the adaptability of the fluid torque converter to a wider scope of application than heretofore, which added advantage suggests the possible extension of the device from the field of heavy duty buses and trucks to the field of lighter faster vehicles, and to similar load handling drives in the special industrial field.

The utilization of bladeless guide spaces at the extremes of the bladed portions of the outflow and inflow zones, in the toroidal working space formed by the converter elements assures a useful degree of smooth flow without fluid turbulence losses otherwise experienced when blade elements are in whole, or part, located so as to project into the bridging guide spaces.

While it appears common to omit blade elements in the radially inward bridging space between inflow and outflow zones, belief is that it is novel to organize the converter elements so as to provide the coupling stage in the outflow zone, the reaction or torque multiplying stage in the inflow zone, and separate them completely by bladeless guide spaces at the radial extremities of the working space.

The section form of the converter working space herein is ellipsoidal, the radial dimensions being parallel for predetermined distances between the unbladed outer and inner radial spaces wherein axial flow occurs. The axial curvature of these flow guide spaces is a section closely approximating a circular dimension, except that the outer wall of the outer space is broadened and faired to receive the high velocity fluid impelled thru the first output rotor vanes. The internal contour of the core portion of the working space is based on a section such that the fluid passing axially across the outer bridging unbladed zone is subject to a small reduction of cross section area which serves to provide an acceleration increment.

This feature is believed novel in this art.

The device herewith is supplied with fluid so that it is kept filled under pressure as suggested by a number of earlier workers in this art, and cooperating means to exchange and circulate the fluid in the working space of the torque converter are found to be satisfactory, while cooling means for the liquid may obviously be furnished where required, to maintain the rate of external heat obsorption sufficiently to support a uniform working space temperature below that at which bearing lubrication might be impaired, at which gas bubbles form, and seals could give way.

We turn now to a demonstration of the above principles in a practical, usable device.

Figures 4, 5:
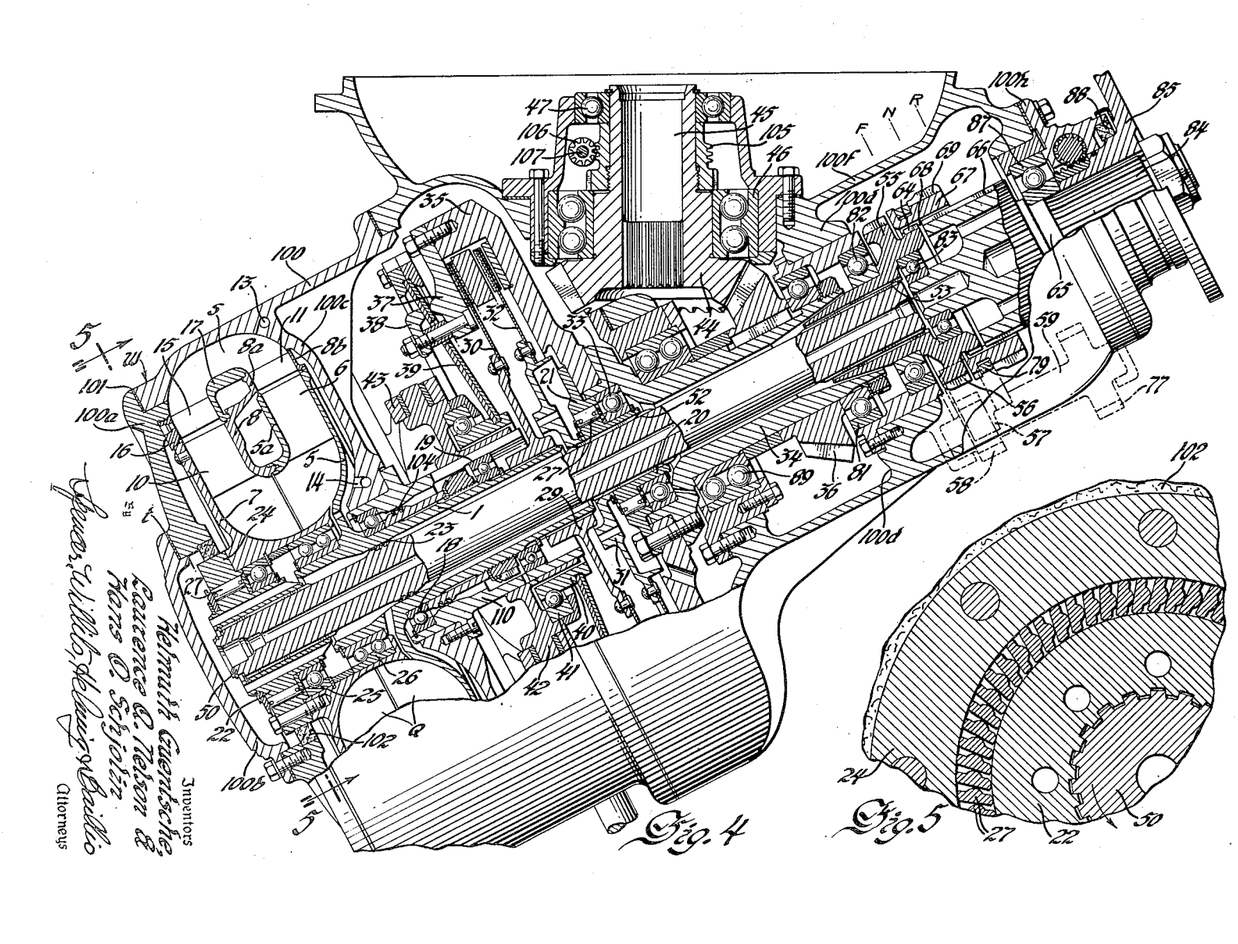
Fig. 4 is a sectional view of a V-drive layout for a large vehicle in which the power plant and drive mechanism is rear-located, and in which the reduction drive is thru a torque converter of the types of Figs. 1 and 2.
Fig. 5 is a part-sectional showing of a form of 1-way clutch used, taken at 5—5 of Fig. 4.

The showing of Fig. 4 represents an actual vehicle installation based on the foregoing teachings, and as will be understood further, is especially arranged to utilize the torque multiplying ability of the 2-stage converter of the present invention.

In this view the hollow power input shaft 1 is integral with impeller shell 5 which with impeller core section 5a supports the attached blades 6. The output turbine member 7 with core ring section 8 supports riveted 2nd stage turbine blades 10, and the section 8a with ring 8b supports the 1st stage turbine blades 11.

The external bladeless channel S is connected externally at passage 13 for circulation of working space fluid to the customary cooler, reservoir and pump system, and passage 13 is located in the higher velocity outflow zone to facilitate such circulation.

The reaction blades 15 are supported in casing web 100a by ring 16 and are fastened to scarf 17 which forms the inner circumferential face of space S. The inner bladeless space Q is approximately evenly divided between the inflow and outflow zones.

Wherever possible the numbers of the elements of the earlier figures herein also appear.

The converter arrangement of Fig. 4 is especially adapted for disassembly and repair. The external housing portion 100 is faced for flange jointing, the end wall section 100a being bolted to section 100 at 101.

The inner radial portion of the end wall 100a is faced at t for flanging and shaped to accommodate the seal 102. The end plate 100b is bolted to web 100a as shown.

Web 100c of housing 100 extends inward where it is faced for matching the flange of sleeve 110 to which it is bolted. The sleeve 110 supports bearings 18 and 19 for the hollow input shaft 1 and impeller member 5.

The central shaft 50 is splined to the hub of 1-way clutch race member 22, is equipped with seal rings 23, and extends to the right where the two splined sections 52 and 53 are shown.

The driven turbine member 7 is bolted at the left to the outer race ring 24 of the 1-way clutch, and it supports the bearing 25 on hub 22 and double-row bearing 26 on an extension of shaft 1 supports member 7.

Shaft 1 terminates at the right of Fig. 4 in a splined portion to fit hub 29 of clutch plate 30. The splined portion 52 of shaft 50 accommodates hub 31 of clutch plates 32, and bearing 33 supports the hub in the leftward end of shaft 34 to which is bolted clutch drum 35 and on which input bevel gear 36 is fixed.

The clutch drum 35 has bolted flange plate 37 and fulcrum plate 38, with an external radial recess for the disc-type clutch load spring 39, the inner radial portion of which is shifted by collar 40 of bearing 41 supported in sleeve 42, movable axially by fork 43 to alternate the actuation of the two clutch plates 30 and 32 in the manner set forth in the applicant's Letters Patent No. 2,380,-677, issued July 31, 1945, for improvements in "Turbo-Drive Control." It is not deemed required herein to elaborate on the shift actuation of the two clutches described.

The bevel gear 44, meshing with gear 36 of shaft 34 is splined on shaft 45 driven from the vehicle engine directly, the casing 100 with its sections supporting shaft 45 thru bearings 46 and 47.

In this drive arrangement input shaft 34, thru drum 35 is alternately coupled by the clutches, either directly to the shaft 50, or thru the fluid torque converter assembly W to shaft 50. The other end of shaft 50 is splined to accommodate the gearbody 55 which is the input member for the forward-reverse gear unit connecting shaft 50 to the transmission output shaft 65.

The gearbody 55 has external teeth 56 meshing with reverse idler teeth 57 which in turn mesh with teeth 58 of the countershaft 59. The gearbody 55 also has jaw clutch teeth 64 aligned with splines 66 of final drive shaft 65, on which slider 67 is mounted, with its teeth 68 meshing for forward drive with jaw teeth 64, as shown. The slider teeth 69 are meshable with teeth 77 of the countershaft 59, for transmitting reverse drive from shaft 50 to shaft 65.

This assembly has two 1-way clutches, of the general form of the showing of Fig. 5. The first of these has external race ring 24 attached to converter output rotor 7, the internal race ring of hub 22 rotating with shaft 50. When clutch 32 couples shaft 50 with 34 in direct drive, the impeller 5 may decelerate to idling or rest condition, while the rotor 7 likewise idles, since the strut members 27 between the race rings are subject to differential rotation, shaft 50 running ahead in the direction of the arrow of Fig. 5. When clutch 30 is energised, the converter W causes race ring 24 to be the faster member, hence the struts 27 are wedged into driving action. This clutch releases upon overrun of shaft 50.

Under certain driving conditions, it is possible that shaft 50 would run ahead faster than rotor 7 during the interval when clutch 30 would be driving, and in order to diminish any undesired differential speed effect, the second 1-way clutch is utilized. Splines 52 of shaft 50 fit splines of inner race ring 20, and outer race ring 21 is attached to input drum 35. Struts 27, as in Fig. 5, are located between these race rings and are phased to prevent shaft 50 from rotating forward faster than shaft 34. It should be observed that upon the change of actuation from clutch 30 to clutch 32, if the shaft 50 is tending to run ahead faster than shaft 34 such as may occur on a down gradient, the second 1-way clutch will couple the shafts at 1-to-1 drive ratio, so that the clutch 32 is engaged under synchronous speed conditions, and is not required to absorb torque differential forces. This is a safety feature which also prevents excess clutch wear, and further permits towing to start a stalled engine, without the drag force of the torque converter requiring extra towing power. This action may occur without either of clutches 30 or 32 being required to deliver towing torque, and with the impeller and rotor of the converter W, both at standstill.

Competitive arrangements of torque converter drives do not have this facility.

The forward-and-reverse gear arrangement noted above is wholly controlled by axial motion of slider 67, from external connections to fork 79. The bearings 81 and 82 with pilot bearing 83 maintain alignment of the shafts 50 and 65 while supporting them in housing section 100f. Shaft 65 is splined at 84 for the output fitting 85. Shaft 34 is supported in bearings 81 and 89. The notations "F," "N" and "R" at the right of Fig. 4 indicate the slider positions for forward, neutral and reverse. Seal 88 prevents oil leakage at driven plate 85.

The sealing arrangement of the torque converter W of Fig. 4 is of interest, in that although the output connection from rotor 7 is coupled thru the 1-way clutch, the converter working space is effectively sealed by seal 102, and by seal rings 23 between shafts 50 and 1, and by seal rings 104 between sleeve 110 and shaft 1.

Circulation of oil to and from the working space under pressure is obtained by a primary pump not shown, driven from shaft 45 thru gears 105, 106 and shaft 107, the pump delivery being to passage 14 in web 100c, thru passage 14 to the inner radial working space zone, with outflow by passage 13 in housing 100. Maintenance of the converter under a positive pressure head avoids cavitation and oil frothing.

The output shaft 65 is disconnected from the power by sliding the slider 67 out of mesh. Forward drive is obtained by moving 67 to the left to mesh clutch jaws 64, 66.

The friction clutches 30, 32 are alternately engaged to transmit the drive of engine-connected shaft 45 directly to shaft 50, or indirectly thru the torque converter W, the clutches being controllable by fluid pressure servo means, and controlled automatically in selecting the drive ratio for best performance or economy.

Reverse drive is obtained by shifting slider 67 to the rearmost "R" position, where teeth 69 mesh with the idler gear teeth.

The converter W of Fig. 4 is made in accordance with the showings of Figs. 1, 2 and 3, and provides performance results during its driving interval similar to the indications on the chart of Fig. 7.

Figure 6:
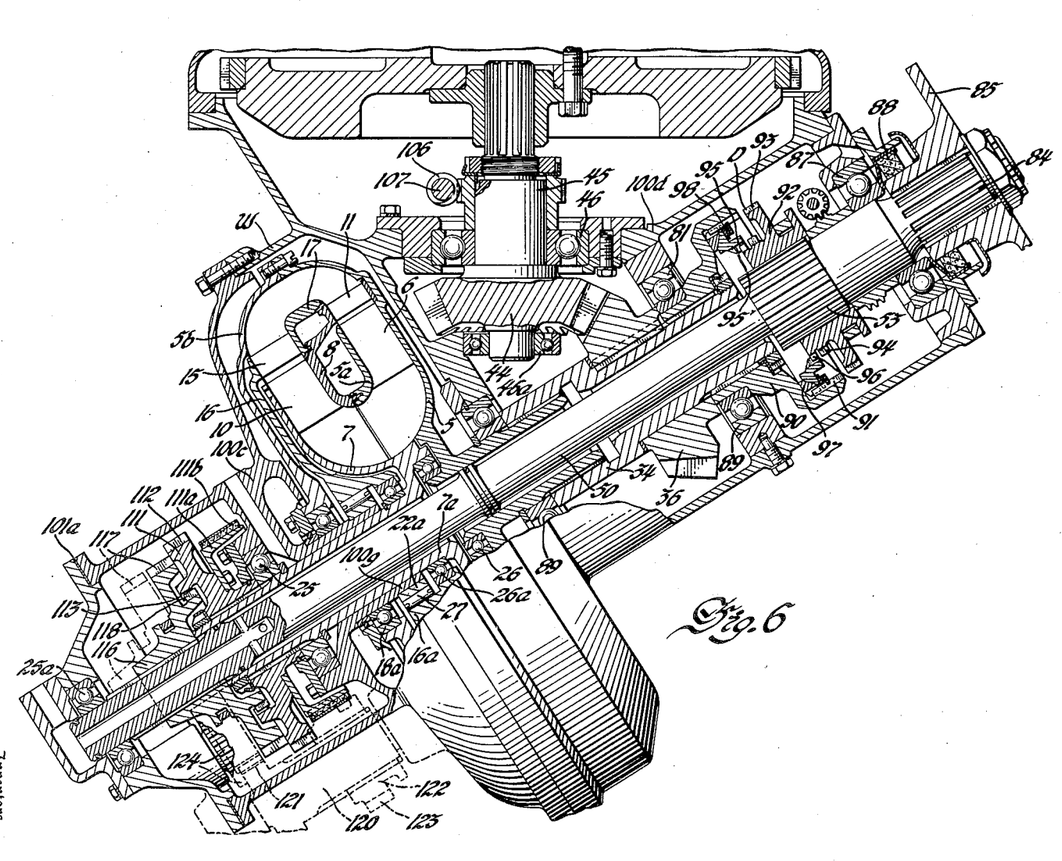
Fig. 6 is similar to the view of Fig. 4, but shows a different arrangement of gears and driving parts associated with the fluid torque converter of the 2-stage type described herein.

The drive arrangement of Fig. 6 resembles that of Fig. 4 with certain important exceptions.

The forward-reverse gear unit is placed at the left of the engine centerline, the direct coupling clutch D is placed at the right, and is a jaw clutch instead of a friction clutch. The converter impeller 6, instead of being clutched and declutched from the input power, is fixed to input shaft 34, so that a temporary churning of the fluid of the converter is experienced, but the reaction member 16 is arranged to rotate being supported on its hub 16a by bearing 26a, the hub 16a being formed as an outer race for a reaction 1-way clutch having strut members 27 as in Fig. 5, the inner race 22a being attached to an extension sleeve 100g of the casing web 100c. The impeller 5 carrying blades 6 is made into a 2-part shell, the leftward overhanging portion 5a being supported on bearing 18a of sleeve 100g. The output rotor 7 is integral with shaft 7a and connected with blades 10 and 11, as in the other figures.

The power input shaft 34 at the right, is splined to jaw clutch member 90, having teeth 91 cut inside the overhanging portion for engaging the teeth 93 of slider 92 splined at 53 on final drive shaft 50. The slider 92 has toothed portions 94 and 96, the teeth 96 meshing with internal teeth 95' of friction ring 95 having an inclined friction face coacting with the adjacent friction face of ring 97 toothed externally to fit the teeth 91 of member 90. A coiled preload spring 98 retained by a lock ring, exerts a light axial force on the friction ring 95 for applying it to the ring 97, while the teeth 94 and 96 are spaced to provide a balking action under attempted meshing of the teeth of slider 93 with teeth 91 until the slider and body are at substantial synchronous speeds.

This general type of constant preload balk ring is explained in full in Letters Patent No. 2,420,914, issued May 20, 1947, to H. O. Schjolin for improvements in "Converter Construction and Control."

Shift of the slider 92 to the left in Fig. 6 is balked or blocked until the speeds of shafts 34 and 50 become synchronized. This delivers the torque of shaft 45 thru bevel gears 44 and 36 to shaft 34 and to output shaft 50, the converter W idling.

The converter output rotor shaft 7a is adapted to drive gearbody 111 to which it is splined at the left of Fig. 6. The gearbody has external gear teeth 112 and internal clutch teeth 113, the shaft 7a being supported in housing 100 by bearings 26 and 25, supporting member 16 thru bearing 26a.

The internal shaft 50 is the output shaft of the drive assembly; is splined at the left for slider 116, and at the right for slider 92, supported by bearings 25a, 89 and 87.

Slider member 116 is toothed externally at 117, and has a ring of jaw clutch teeth 118 which in forward drive mesh with teeth 113 of the gearbody 111. Slider 116 is movable to the left to disengage teeth 113—118 as shown by the dashed outline in Fig. 6.

The countershaft 120 is toothed at 121, and is splined for slider 122 toothed at 123 and movable by a fork to mesh with teeth 112 of gearbody 111 splined to hollow shaft 7a, supported by bearings 25a and 87.

The countershaft teeth 121 are in constant mesh with reverse idler gear 124 supported in the casing 100. When the slider 116 is moved to the left, the teeth 117 are meshed with the reverse idler gear 124, while the countershaft idler teeth 123 are meshed with the teeth 112 of gearbody 111. The reverse train of connection is therefore from shaft 7a, to gearbody 111, thru teeth 112, slider teeth 123, countershaft 120, teeth 121, idler 124, teeth 117 and slider 116 to shaft 50.

The motion of slider 116 to the left, of course, disengages the jaw clutch teeth 113—118.

The motions of the sliders 116 and 122 are coordinated by the external linkage so that in forward drive by jaw teeth 113, 118, the countershaft group is non-rotating, which avoids needless gear oil churning.

The gearbody 111 is fitted with a drum 111a on which a brake band 111b may be clamped by the external control mechanism, for bringing shaft 7a and gearbody 111 to rest for facilitating meshing of the related elements.

Fig. 6 demonstrates the gear and slider arrangement in dashed line.

Figure 8:
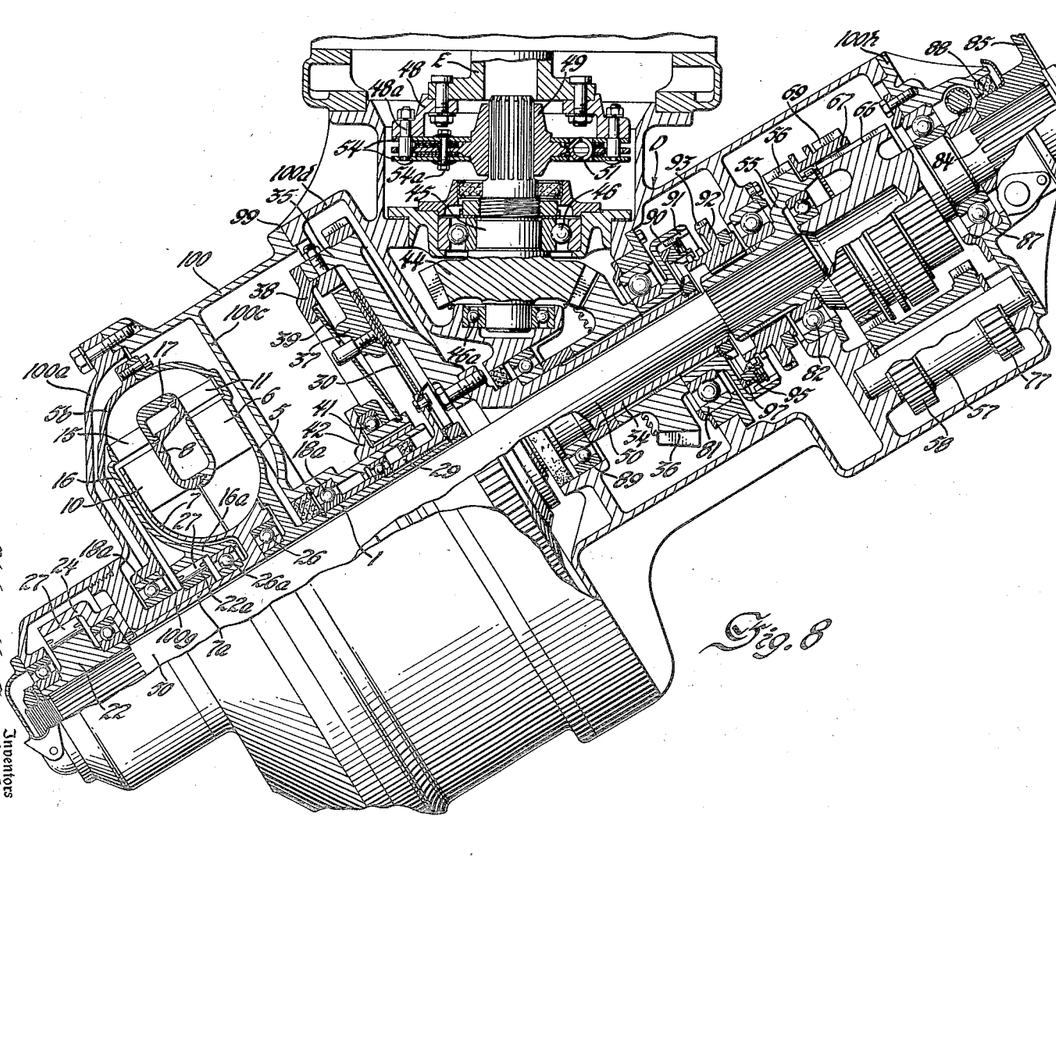
Fig. 8 is a view similar to those of Figs. 4 and 6, but of a modification in which the direct drive transfer point lies forward of the point of initial power conversion, provided by a jaw clutch in place of the friction clutches of the other two figures.

The Fig. 8 modification has primary input drive thru the bevel gears 44, 36 to shaft 34 which is fixed to clutch drum 35 and to the jaw clutch member 90 of device D. The long shaft 50 is splined at the left for the driven member 22 of 1-way clutch 24, 27, 22, and is splined at the right for gearbody 55 on which teeth 56 provide initial reduction drive for the reverse countershaft group, similar to the forward and reverse gear unit of Fig. 4.

Clutch plate 30 is clamped by presser plate 37 under the load of disc spring 39 as controlled by collar 42, the hub 29 being splined to hollow shaft 1 of converter impeller 5. The overhanging drum 5b is supported in bearing 18a. The converter output turbine blades 10 and 11 are carried on the rotor 7, joined by the element 8. The reaction blades 15 are fixed to scarf 17 and supported on rotatable flange shell 16, the hub 16a being supported on bearing 26a. The inner portion of hub 16a is machined to form a race for the sprag members 27, the inner race 22a of which is formed on sleeve 100g which is an extension of the casing part 100c. The shaft 7a of rotor 7 is formed at its leftward end into drum 24 for the 1-way clutch 24, 27, 22, the sprags 27 bearing on the outer face of hub 22 splined on shaft 50. The gear train arrangement provides connection to final drive shaft 65, as in Fig. 4.

For vibration damper purposes, the engine shaft E is fitted with collar 48 supporting studs 48a which locate friction plates 54 on either side of web hub member 49 splined on the stub shaft 45. The member 49 is rotationally slotted to permit limited relative rotation between the studs 48a and the web of 49. Coil springs 51 transmit the torque between 48 and 49 being end-located in recesses in plates 54 and bearing on fingers of the web of hub 49. Compression studs 54a are adjusted to vary the friction damping effect of the device. Friction washers of selected coefficients may be inserted between the plates 54 and the web of hub 49 to provide adequate energy absorption for a given installation.

The Fig. 8 arrangement places the converter and control mechanism therefor to the left of the engine centerline, and the positive jaw and gear train mechanism to the right, making it possible to perform repairs more rapidly, since common mechanical troubles are ordinarily isolated in one of the two groups rather than in both. It will be perceived that the entire converter and control mechanism assembly may be detached at the left of joint 99 between the casing sections 100 and 100d; and that the entire gear mechanism and direct drive jaw clutch device D may be detached for repair or replacement by removal of plate 100h.

The operation of the converter W of Figs. 6 and 8 is somewhat different from that of Figs. 1 to 4 in that the reaction member 15, 16 is permitted forward rotation by the 1-way clutch 16a, 27, 22a. Under initial high differential speeds of the input member 5 and output member 7, such as caused by engine acceleration at low vehicle speeds, the reaction force on member 15, 16 is high, and in the negative rotational direction, and the torque multiplication force is greatest.

Rise of vehicle speed with diminished torque causes the flow angles of the fluid entering the reaction blades 15 to change to a point where there is zero angularity, followed by a period when the stream flow actually impinges on the opposite faces of the reaction blades. Under these conditions, the reaction member becomes a rotor, being swept into the stream and partaking of speeds eventually equaling those of the impeller 5, the process permitting rotation and torque transfer by which the member 7 approaches the speed of the impeller 5, or approximate 1-to-1 ratio.

In this state, a momentary closing motion of the engine throttle may establish synchronous speeds of shafts 34 and 50 at which time, device D of Fig. 6 or 8 may be quickly and readily engaged for direct drive. In the Fig. 8 arrangement, the momentary fall of impeller speed may permit member 7 and drum 24 to lag so that there is a short time interval when there is no torque between shafts 34 and 50, prior to the coupling action of the direct drive clutch D.

The operational sequences of the drive constructions of Figs. 4, 6 and 8 are now given.

The construction of Fig. 4 is forward drive-initiated by shifting slider 67 from "N" to "F," and by moving collar 42 from fork 43 to cause spring 39 to clamp clutch plate 30, transmitting the engine power to shaft 50 thru the converter W and 1-way clutch 22, 27, 24. If the engine shaft 45 be decelerated to a speed for shaft 34 lower than that of shaft 50 the 1-way clutch 21, 27, 20 will connect the shafts at 1-to-1 ratio. Shift to direct drive is had by moving collar 42 to cause spring 39 to clamp clutch plate 32, coupling drum 35 of shaft 34 to shaft 50. The 1-way clutch 21—27—20 is therefore able to act as a 1-way synchronizer for shafts 34 and 50 for the upshift interval to direct. This feature may be utilized to save wear of clutch 32.

Drive in reverse is preferably obtained during the interval when clutch plate 30 is clamped to the drum 35, although for some drive applications, a dwell interval between clamped conditions for the plates 30 and 32 would provide neutral between shafts 34 and 50 during which the slider 67 may mesh teeth 69 with teeth 77 of the countershaft group, for reverse drive.

The construction of Fig. 6 is put in forward drive from neutral by engaging the teeth 118 of slider 116 with teeth 113 of gearbody 112, which couples the converter output member 7 with shaft 50. Engagement of direct drive jaw clutch D connects shafts 50 and 34 positively. The converter output shaft 7a may be uncoupled by rearward movement of slider 116, so that the converter elements spin unloaded. The jaw coupling 113, 118 may be left connected, since the reaction member 16 is free to spin forward because of the 1-way clutch 22a—27—16a.

In Fig. 6, reverse drive is obtained by shifting the two sliders 116 and 122 to the left, to engage the toothed members of the reverse gear train, the device D being disengaged. The reverse drive is a reduction ratio of one fixed gear step plus the variable ratio step furnished by the converter W.

It should be observed that the Fig. 6 arrangement places the entire gear-and-converter train to the left of the engine centerline, wherein both are especially accessible for removal and repair.

The installation which includes the direct drive jaw clutch mechanism D is required to be operated so that the jaw motion is biased for clutch engagement by a spring or similar means preceding the synchronism interval, which operation may be accelerated, or its time interval shortened by manipulation of the engine accelerator; and further, that a similar manipulation precede the application of disengagement force to slider 92 of device D, for unloading the drive torque on the flat sides of the jaw clutch teeth.

The arrangement of Fig. 8 operates as follows. Starting of the engine applies rotation to shaft 34, clutch drum 35 and direct drive jaw member 90. There is no torque until clutch plate 30 couples drum 35 to impeller 5, it being assumed that slider 67 has been coupled to a gearbody 55 fixed to shaft 50. The converter output member 7 being coupled to shaft 50 by the 1-way clutch 24, 27, 22, is driven at variable speed by the converter W.

At a given speed torque condition for the torque converter, the reaction member 15 is caused to rotate forwardly and spin forwardly with the impeller 5 and rotor 7. Momentary reduction of the engine throttle permits the shaft 34 to fall below the speed of shaft 50, when the jaw clutch D connects shafts 34 and 50 solidly. Clutch 30, 35 is disengaged, to permit the converter impeller 5 to come to rest, and rotor 7 also stops rotation since 1-way clutch 24, 27, 22 permits shaft 50 to run forwardly faster than shaft 7a. The drive in jaw-clutch-direct, thru device D is therefore available for continuous cross-country operation without the converter members rotating at all.

For shift to neutral, since the drive is positively coupled by device D and by slider 67, it is required to remove the torque from the flat sides of the slider teeth, of either, and for shift to converter drive, clutch 30, 35 may be partially engaged to spin the impeller followed by the same release operation for device D, so that ensuing engine acceleration will bring the converter output member 7 up to the speed of shaft 50, when the 1-way clutch 24, 27, 22 will transmit converter drive to output.

Reverse shift is made during the drive interval of clutch and converter W, by shifting slider 67 to the right for picking up the countershaft train, similar to the Fig. 4 arrangement.

Fig. 9 is a chart to show the useful results of the converter arrangement herein of Figs. 1 to 6 and 8 inclusive, taken from actual test results.

The abscissae across the bottom of the chart represent converter output R. P. M., and the ordinates at the right represent converter impeller R. P. M.

Curve A on this scale covers the normal operation of a Diesel engine driving the assembly, governor regulated to hold 2000 R. P. M.

The outer left ordinate of the chart shows the torque ratio of the drive, the curve B giving same for the different R. P. M. of converter output.

The inner left ordinate provides the converter output to input efficiency, on curve C.

Figure 10:
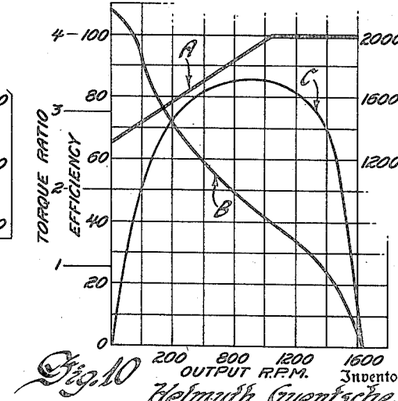

Fig. 10 is a similar chart for a higher torque engine and converter.

These charts are provided to show those skilled in the art, the useful results obtainable with the device of the present invention.

The foregoing description covers a special type of 2-stage torque converter, comparable in useful results with other converters of more elaborate construction. The description also shows the true operating characteristics of this special form of converter, by which persons skilled in the art may adapt the present converter to many power-handling applications. The specification endeavors to show how the converter may be variously applied to the drive problems of large heavy vehicles such as busses and trucks, and three different drive patterns of combinations with clutch and gear elements, are given. These drive pattern combinations are of especial importance to operators of such vehicles who are required to maintain them over a maximum number of road hours per time—which stresses the need for convenience of disassembly and assembly, selectively by power unit groups of the drive mechanism.

The advantages of these drive arrangements are believed adequately stated above, and are especially noteworth in connection with the simple 2-stage torque converter of the invention. This torque converter in one general form, that of Figs. 1, 2, 3 and 4 has a non-rotating reaction element, its output being 1-way clutch coupled so that, as in Fig. 4, when the drive of the engine is by-passed from the impeller the whole unit is at rest. The Fig. 6 version permits the impeller to remain engine coupled during the non-driving interval of the converter, and the other bladed elements to spin idly. The Fig. 8 arrangement in a sense, combines the drive patterns of those of Figs. 4 and 6 in that the impeller of the converter may be declutched, the output rotor is permitted to idle during positive forward drive, and the reaction rotor to spin. These various drive arrangements permit the designer to choose of these combinations, one which best fits a particular set of requirements.

In the specification above, novelty has been asserted for the particular working space arrangement of the converter elements and supporting structure, and also for the various drive patterns disclosed. These points of novelty combination are supported on the one hand by graphic charts representing tests of actual converter constructions, and on the other by statements covering the drive pattern assemblies.

It is appreciated that there have been and are many workers in this field of art and that the scope of the novelty combinations to be claimed, based on the present disclosures, will be necessarily limited by prior revelations in this field; however, it is to be clearly understood that the examples of practical application of the invention given herein are not to be considered restrictive to the specific examples provided, and that many, various and sundry departures may be made by those skilled in the art based on the principles and teachings herein, without evading the scope of the invention as outlined in the appended claims.

We claim:

1. An arrangement of drive-transmitting mechanism consisting of a power plant having an engine shaft, and of a variable ratio transmission drive assembly adapted to be coupled to an output shaft, said shafts lying in one plane and at an oblique angle to each other, a primary input drive gear group located centrally of said assembly and adapted to transmit power between said engine shaft and said assembly, a longitudinal arrangement of drive members of said assembly consisting of a fluid torque converter, a pair of friction disc clutches, a gear member of said group and a forward-and-reverse gear unit adapted to drive said output shaft, a clutch drum rotating with said gear member and having clamping mechanism for selective coupling of said friction clutches, a hollow shaft connecting one of said clutches to the input of said converter, a central shaft adapted to be driven by the second clutch or by the output of said converter thru a 1-way clutch, a second 1-way clutch operative to couple said central shaft with said drum when the central shaft rotates faster than the drum, a positive jaw direct drive clutch of said unit operative to connect said central and output shafts including a toothed slider member splined on said output shaft, a reversing gear train driven by said central shaft and adapted to be coupled to said slider when said slider is uncoupled from said central shaft, and control means for said friction clutches consisting of actuator mechanism operative to alternate the engagement of the clutches and operative to provide initial coupling of said clutch drum and said central shaft prior to the engagement of said second clutch.

2. In power transmission devices, a variable torque mechanism having input and output members, a driving drum, a driven shaft which is 1-way clutch coupled to both said output member and said drum by separate 1-way clutches, clutching means selectively operative to connect the drum to said input member or to said driven shaft, a step gear train having forward and reverse driving elements and adapted to drive a load shaft, said train including a clutch device adapted to connect said driven and said load shafts, and control mechanism for said clutching means operative to establish 1-way clutch coupling of said drum and driven shaft sequentially prior to the connection of said driven shaft to said drum by said means during an interval when the speed of said driven shaft would tend to exceed that of said drum, and a control for said train and said device operable separately from the said control mechanism for said clutching means effective to establish drive from said driven shaft to said loadshaft for either selective drive operation of said clutching means.

3. In combination a variable speed engine, a fluid torque converter having input and output members, a clutch drum, an engine power shaft driving said drum, a power output shaft, a friction clutch element fixed to said output shaft and operable to be coupled with said drum, a second friction clutch element fixed to said input member and adapted to be similarly coupled with said drum, a first one-way clutch arranged to connect said output shaft with said drum when the speed of said shaft tends to exceed the drum speed, a second one-way clutch arranged to connect said output shaft with said converter output member when said output member speed tends to exceed the output shaft speed, a load shaft, a change speed gear unit adapted to drive said load shaft, said gear unit including a clutch device operable to drivingly connect said power output shaft to said load shaft, control means for said friction clutches for alternatively connecting said engine shaft directly to said power output shaft or to connect said engine shaft indirectly to said power shaft through said torque converter and said second one-way clutch, and means for controlling said clutch device independently of said friction clutch control means.

4. A drive transmitting mechanism consisting of a power plant having an engine shaft and a variable ratio transmission drive assembly adapted to be coupled to a driven shaft, said shafts being disposed at an oblique angle to each other; means coupling said engine shaft to a driving shaft in said assembly; said assembly including a fluid torque converter, a change speed gear unit and a central shaft intermediate said torque converter and said change speed gear unit, said torque converter including input and output elements, said output element being adapted to be coupled to said central shaft, a first coupling means for connecting said driving shaft and said converter input element, a second coupling means for connecting said driving shaft directly to said central shaft, means for connecting said central shaft to said driving shaft only when the central shaft tends to rotate faster than the driving shaft, said change speed gear unit being disposed intermediate said central shaft and said driven shaft to transmit drive therebetween, first control means for said gear unit for selectively variably coupling said central and said driven shafts, and second control means for said first and second coupling means to alternatively connect said driving shaft to said central shaft either directly or through said torque converter.

5. A drive transmitting mechanism consisting of a power plant having an engine shaft and a variable ratio transmission drive assembly adapted to be coupled to a driven shaft, said shafts being disposed at an oblique angle to each other, means coupling said engine shaft to a driving shaft in said assembly, said assembly including a fluid torque converter, a forward and reverse step gear train and a central shaft intermediate said torque converter and said gear train, said torque converter including input and output elements, said output elements being adapted to be coupled to said central shaft, a first coupling means for connecting said driving shaft and said converter input element, a second coupling means for connecting said driving shaft directly to said central shaft, means for connecting said central shaft to said driving shaft only when the central shaft rotates faster than the driving shaft, said gear train being disposed intermediate said central shaft and said driven shaft to transmit drive therebetween, control means for said gear train for selecting forward or reverse drive for said driven shaft, and control means for said first and second coupling means to alternatively connect said driving shaft to said central shaft either directly or through said torque converter.

6. A drive transmitting mechanism consisting of a power plant having an engine shaft and a variable ratio transmission drive assembly adapted to be coupled to a driven shaft, said shafts being disposed at an oblique angle to each other, means coupling said engine shaft to a driving shaft in said assembly, said assembly including a fluid torque converter, a forward and reverse gear train and a central shaft intermediate said torque converter and said gear train, said torque converter including input and output elements, a first one-way clutch for coupling said output element to said central shaft to transmit drive thereto, a first coupling means for connecting said driving shaft and said converter input element, a second coupling means for connecting said driving shaft directly to said central shaft, a second one-way clutch element adapted to connect said central shaft with said driving shaft only when the central shaft rotates faster than the driving shaft, said gear train being disposed intermediate said central shaft and said driven shaft to transmit drive therebetween, control means for said gear train for selecting forward or reverse drive for said driven shaft, and control means for said first and second coupling means to alternatively connect said driving shaft to said central shaft either directly or through said torque converter.

7. A drive transmitting mechanism consisting of a power plant having an engine shaft and a variable ratio transmission drive assembly adapted to be coupled to a driven shaft, said shafts being disposed at an oblique angle to each other, bevel gear means for coupling said engine shaft to a driving shaft in said assembly, said assembly including a fluid torque converter and a change speed gear unit and a central shaft intermediate said torque converter and said change speed gear unit, said torque converter including input and output elements, a first one-way clutch for coupling said output element to said central shaft when the speed of said element tends to exceed the speed of said shaft, a first friction clutch device for connecting said driving shaft and said converter input element, a second friction clutch device for connecting said driving shaft directly to said central shaft, a second one-way clutch element adapted to connect said central shaft with said driving shaft when the central shaft tends to rotate faster than the driving shaft, said change speed gear unit being disposed intermediate said central shaft and said driven shaft to transmit drive therebetween, control means for said gear unit to transmit forward or reverse drive to said driven shaft, and control means for said first and second coupling means to alternatively connect said driving shaft to said central shaft either directly or through said torque converter.

8. In combination with a variable speed engine, a fluid torque converter having input and output members; an engine shaft; an intermediate shaft; a multiple clutch mechanism for variously connecting said engine and said intermediate shafts, said mechanism including a clutch drum driven by said engine shaft, a first friction clutch element fixed to said output shaft and operable to be coupled with said drum, and a second friction clutch element fixed to said torque converter input member and adapted to be similarly coupled with said drum; a first coupling device arranged to connect said torque converter output member with said intermediate shaft only when the speed of said member tends to exceed the speed of said shaft; a second coupling device arranged to connect said intermediate shaft with said drum when the speed of said shaft tends to exceed the drum speed; a load shaft; a change speed gear unit adapted to drive said load shaft, said gear unit including a clutch device operable to drivingly connect said intermediate shaft and said load shaft; control means for said multiple clutch mechanism for alternatively connecting said engine shaft directly to said intermediate shaft or to connect said engine shaft indirectly to said intermediate shaft through said torque converter and said first coupling device; and means for controlling said clutch device independently of said friction clutch control means.

9. In a power transmission device, a variable torque mechanism having input and output members, a driving drum, a first shaft, first coupling means for operatively connecting said output member to said shaft only when the speed of said output member tends to exceed the speed of said shaft, a second coupling means for operatively connecting said shaft to said drum only when the speed of said shaft tends to exceed the speed of said drum, clutching means selectively operative to connect the drum to said input member or to said shaft, a control mechanism for said clutching means, a second, a change speed gear unit intermediate said shafts and, said gear unit including a clutch device for operatively connecting said shafts, and a control for said gear unit and said device operable separately from said control mechanism for said clutching means effective to establish drive from said first shaft to said second shaft for either selective drive operation of said clutching means.

10. In a power transmission device, a variable torque mechanism having input and output members, a driving drum, a first shaft, a first one-way clutch device for operatively connecting said output member to said shaft only when the speed of said member tends to exceed the speed of said shaft, a second one-way clutch device for operatively connecting said shaft to said drum only when the speed of said shaft tends to exceed the speed of said drum, friction clutching means selectively operative to connect the drum to said input member or to said shaft, a control mechanism for said clutching means, a second shaft, a change speed gear unit intermediate said shafts, said gear unit including a clutch device for operatively connecting said shafts, and a control for said gear unit and said device operable separately from said control mechanism for said clutching means effective to establish drive from said first shaft to said second shaft for either said selective drive operation of said clutching means.

References Cited in the file of this patent

UNITED STATES PATENTS

| Number | Name | Date |
| --- | --- | --- |
| 2,102,635 | Lysholm et al. | Dec. 21, 1937 |
| 2,133,029 | Kugel | Oct. 11, 1938 |
| 2,140,324 | Lysholm | Dec. 13, 1938 |
| 2,369,126 | Baker | Feb. 13, 1945 |
| 2,403,954 | Schjolin | July 16, 1946 |
| 2,435,930 | Schjolin | Feb. 10, 1948 |